United States Patent [19]

Gelinas

[11] Patent Number: 4,893,738

[45] Date of Patent: Jan. 16, 1990

[54] SELF-ALIGNING POSITIVE DISPLACEMENT DISPENSER

[75] Inventor: William A. Gelinas, Hadley, Mass.

[73] Assignee: Loctite Corporation, Newington, Conn.

[21] Appl. No.: 255,877

[22] Filed: Oct. 11, 1988

[51] Int. Cl.⁴ .................................................. B67D 5/40
[52] U.S. Cl. .................................... 222/380; 222/309; 222/334; 417/489
[58] Field of Search ................ 222/309, 333, 334, 504, 222/372, 376, 380, 381, 387, 251, 258, 261, 262, 263; 417/489

[56] References Cited

U.S. PATENT DOCUMENTS

| | | |
|---|---|---|
| 1,700,349 | 1/1929 | Bystricky . |
| 1,932,921 | 10/1933 | Bizzarri ............................ 417/489 X |
| 1,949,497 | 3/1934 | Stafford et al. ...................... 222/334 |
| 1,963,399 | 6/1934 | Brown ................................. 222/262 |
| 2,010,165 | 8/1935 | Tear .................................. 222/381 X |
| 2,272,252 | 2/1942 | Sponsel . |
| 2,505,839 | 5/1950 | Scovell .............................. 222/262 |
| 3,057,521 | 10/1962 | Ballard ............................... 222/262 |
| 3,221,937 | 12/1965 | Kamborian ...................... 222/334 X |
| 3,291,350 | 12/1966 | Malec ............................... 417/489 X |
| 3,742,949 | 7/1973 | Hill . |
| 3,809,298 | 5/1974 | Harris, Sr. et al. . |
| 4,180,239 | 12/1979 | Valukis . |
| 4,247,023 | 1/1981 | Shew . |
| 4,262,820 | 4/1981 | Flint . |
| 4,347,806 | 9/1982 | Argazzi et al. . |
| 4,353,325 | 10/1982 | Argazzi . |
| 4,394,945 | 7/1983 | Taylor, Jr. . |
| 4,526,295 | 7/1985 | Morel et al. . |
| 4,545,507 | 10/1985 | Barall . |
| 4,662,545 | 5/1987 | Kenney . |
| 4,678,100 | 7/1987 | Gelinas et al. . |

OTHER PUBLICATIONS

"Operating Instructions 725D Piston Valve", EFD Incorporated, Liquid Metering Valves, 977 Waterman Avenue, East Providence, Rhode Island 02914.

Primary Examiner—Kevin P. Shaver
Attorney, Agent, or Firm—Davis, Bujold & Streck

[57] ABSTRACT

Modular positive displacement apparatus for dispensing precise quantities of a fluid product including a dispensing unit and an actuator unit. A housing of the dispensing unit defines a reservoir, a chamber and closure valve. The reservoir is divided into a plurality of sub-reservoirs, which contains the product. The walls dividing the reservoir into a plurality of sub-reservoirs provide guide surfaces for self-alignment of a product piston in the reservoir. A deformable diaphragm isolates the reservoir from the mechanism which actuates the valve to prevent undesirable entry of the product. The dispensing unit is readily removable from the actuator unit and can be readily replaced with another dispensing unit. Different nozzle sizes can also be accommodated. The extent of the closure opening is adjustable in discrete increments.

28 Claims, 2 Drawing Sheets

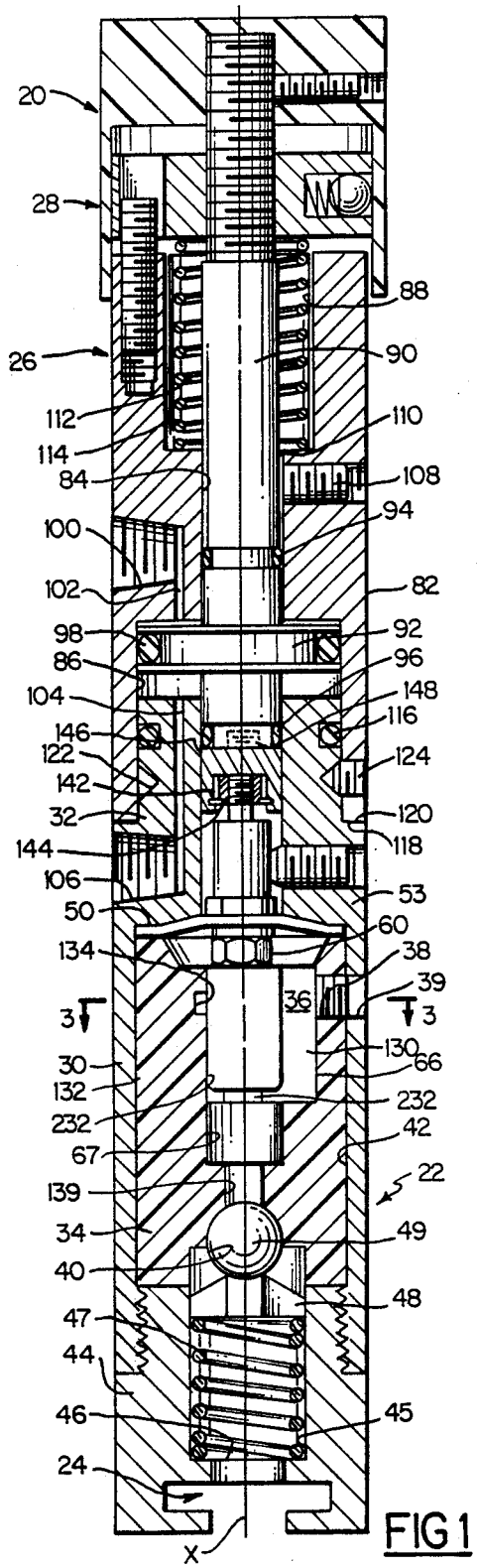
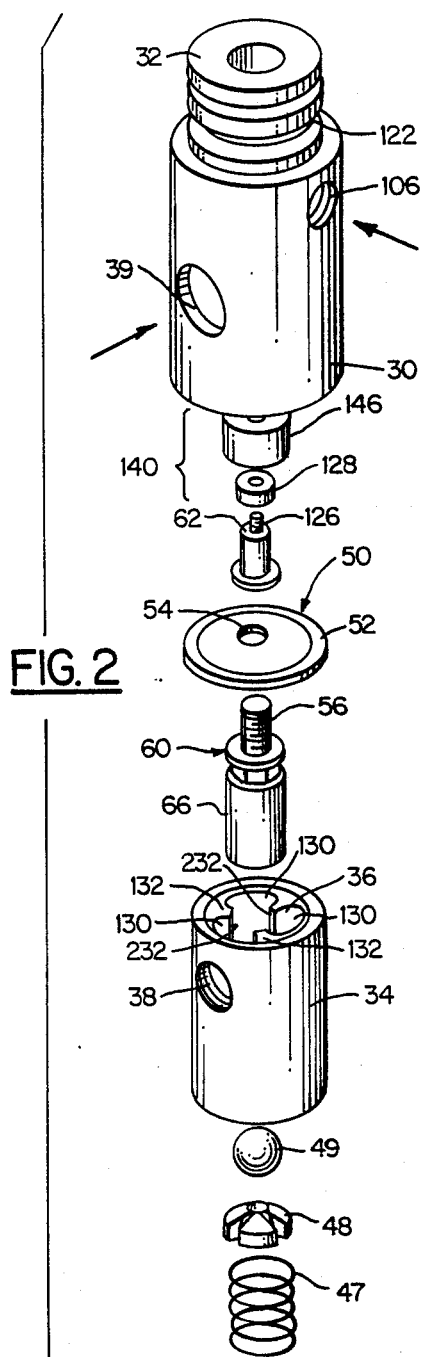

SELF-ALIGNING POSITIVE DISPLACEMENT DISPENSER

BACKGROUND OF THE INVENTION

I. Field of the Invention

The present invention relates generally to fluid dispensing mechanisms and, more particularly, to a self-aligning positive displacement dispenser.

Sealants and adhesives, especially of the high viscosity type, are oftentimes difficult to dispense in an accurate and controlled manner. Excessive amounts of dispensed material are wasteful and give a sloppy appearance while insufficient amounts could affect the sealing quality. Moreover, the dispensing should be carried out quickly without compromising accuracy. II. Description of the Prior Art There are a number of known designs for dispensing fluids such as adhesives, sealants, and the like, at accurately controlled flow rates, in accurate quantities, and for accurate placement on a receiving surface.

The commonly assigned U.S. Pat. No. 4,347,806 to Argazzi et al issued Sept. 7, 1982 and entitled "Liquid Dispensing Apparatus" discloses a positive displacement type of valve in which a quantity of the fluid is admitted into a chamber whereupon a piston then forces that quantity of fluid out through the dispensing outlet or nozzle. In this instance, and in other known instances of the prior art, piston alignment problems result in premature wear of the moving components, seal leakage problems, poor performance and reliability.

It is noteworthy that loss of the fluid that does not issue from the outlet nozzle but instead finds its way into other cavities of the dispensing mechanism is not the primary concern. Rather, when the fluid is a sealant or adhesive material, it subsequently accumulates, then hardens, and thereby has a detrimental effect on the operation of the dispensing mechanism, even to the point of rendering it inoperative.

A significant improvement in the state of the art occurred with the inventions disclosed in the following co-pending and commonly assigned applications: Ser. No. 57,614 filed June 3, 1987, Ser. No. 176,875 filed Apr. 4, 1988 and Ser. No. 176,877 filed Apr. 4, 1988 which are hereby incorporated by reference in their entirety. While not a positive displacement pump, the invention of Ser. No. 57,614 relates to a simplified fluid dispenser for dispensing precise quantities of fluid without requiring special seals or springs. It comprises a housing defining a fluid reservoir having an inlet for delivery of pressurized fluid to the reservoir, and including a valve seat defining an outlet for dispensing fluid from the reservoir. A deformable end cap overlies an open end of the housing opposite the outlet and normally biases a valve engageable with the valve seat to the closed position. The valve is opened by an opening force applied by way of a valve stem against the bias of the end cap. It is able to dispense fluids having an extremely broad range of viscosities, namely, from one centipoise to a value substantially in excess of one million centipoises.

Furthermore, the dispenser of that invention can be turned on and off instantaneously, that is, starting and stopping the flow of fluid occurs at substantially the same time as operation of the valve actuator. Another significant feature of that invention resides in its construction and manner of operation according to which movement of an actuator used to operate the dispenser causes simultaneous and equal movement of the valve off its seat for dispensing the fluid. This feature allows the dispenser to operate at very high actuation speeds. In actuality, the dispensing of the fluid is substantially simultaneous with the actuation of the valve and continues while the valve remains open.

Ser. No. 176,877 relates to a sealless modular dispenser while Ser. No. 176,875 discloses a sealless modular positive displacement dispenser, which is a significant improvement over the device disclosed in Ser. No. 57,614. However, there is no provision for self-alignment of the dispensing piston in the fluid reservoir with the result that the aforementioned problems associated with piston misalignment are not overcome.

It is an object of the present invention to provide a reservoir design which provides for self alignment of an associated piston in a positive displacement dispenser to thereby reduce premature wear of the moving components and improve the performance and reliability of the dispensing apparatus.

It is a further object of the present invention to provide a simplified interconnection between the piston and the means for reciprocating that piston which accommodates anticipated misalignment between these.

SUMMARY OF THE INVENTION

The present invention incorporates a reservoir design providing for self alignment of the associated piston to provide a superior dispensing mechanism of the positive displacement type. To this end, a modular positive displacement apparatus for dispensing precise quantities of a fluid product is disclosed which includes a dispensing unit and an actuator unit. A housing of the dispensing unit defines a reservoir, shaped to align a piston housed therein, which contains the fluid product under pressure. Within the housing is a ball-type closure mechanism which is actuated by a charge or predetermined quantity of the product itself. A deformable diaphragm or other sealing arrangement, for example an O-ring seal or bellows arrangement, isolates the reservoir from the mechanism which actuates the closure to prevent undesirable entry of the product in non-desired areas.

According to the present invention there is provided a positive displacement apparatus for dispensing precise quantities of a fluid product comprising: housing defining a fluid reservoir and having an inlet for delivery of fluid to said reservoir and including a closure surface defining an outlet for dispensing the fluid product from said reservoir; closure means normally biased to a closed position in engagement with said closure surface; chamber intermediate said reservoir and said closure surface for receiving a defined charge of the product; and product piston movable between an inactive position within said reservoir withdrawn from said chamber and an active position sealingly, slidably received within said chamber to move said closure means, by means of the fluid product within said chamber, to an open position and thereby dispense the defined charge of the fluid product from said chamber; said fluid reservoir being defined by a plurality of sub-reservoirs, forming walls providing guide surfaces for said product piston to provide self-alignment of said product piston for its slidable receipt in said chamber, said plurality of sub-reservoirs being interconnected by means for facilitating flow of said fluid product therebetween.

The dispenser of the invention is able to dispense fluid products of a broad range of viscosities, from at least one to at least one million centipoises. This ability is achieved by means of a curing resistant design according to which the fluid reservoir has a relatively large cross-sectional area while the stem for actuating the closure has a relatively small cross-sectional area. Additionally, the preferable use of a spherical closure, or check ball, in combination with a conical seat results in a line, rather than area, contact between the closure elements, thereby effectively guarding against bonding of the mating surfaces and undesirably causing the closure to be sealed in the closed position.

Another feature of the invention resides in its ability to accurately dispense discrete quantities of a fluid product enabling its use for statistical process control applications.

BRIEF DESCRIPTION OF THE DRAWINGS

The invention will now be described, by way of example, with reference to the accompanying drawings, in which:

FIG. 1 is a front elevation view, largely cut away and in section, of modular dispensing apparatus illustrating one embodiment of the invention;

FIG. 2 is an exploded view of dispensing and nozzle units comprising part of the apparatus illustrated in FIG. 1;

DESCRIPTION OF THE PREFERRED EMBODIMENTS

Figure 3:
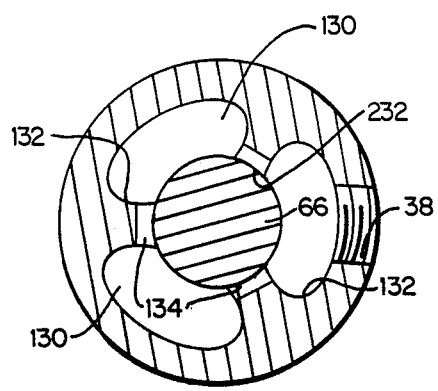
FIG. 3 is a cross-section on section line 3—3 in FIG. 1 of the reservoir and piston assembly shown therein.

Turn now to the drawings and, initially to FIG. 1, which illustrates a modular positive displacement dispensing apparatus 20 embodying the present invention. The apparatus 20 comprises a dispensing unit 22, a nozzle unit 24, an actuator unit 26, and an adjustment unit 28. The dispensing unit and the actuator unit will be described in detail together with an explanation of their interrelationship.

The description will begin with the dispensing unit 22 which includes a cylindrical housing 30 with an end member 32 of reduced diameter. An insert 34 is fittingly receivable within the housing 30. The insert 34 defines a reservoir 36 capable of receiving pressurized product from a distance source (not shown) via an inlet 39 in the housing 30 and an aligned inlet 38 in the insert. The insert 34 is formed at its lower end with a conical closure surface 40, and is preferably composed of a suitable material compatible with the fluid product to be dispensed. Suitable materials include, but are not limited to, DELRIN brand plastic, polyethylene, polypropylene, nylon, polyester, metals including stainless steel (preferably 316 stainless steel), ceramics, and most preferably fluorinated hydrocarbon polymer, for example, Teflon brand plastic. The insert 34 is fittingly received in a counterbore 42 formed at the lowermost end of the housing 30. It will be appreciated that the housing 30 and insert 34 may be of one piece construction and that they are only described as being separate for ease of fabrication.

The extreme end of the housing 30 opposite the end member 32 is internally threaded so as to receive a cap member 44. The cap member 44 has an internal bore 45 with a shoulder 46 therein. A compression spring 47 is received in the bore 45 and at one end engage the shoulder 46. At its opposite end, the spring 47 engages a suitable retainer 48 which, in turn, supports a gate member, preferably in the form of ball 49, and holds it normally in engagement with the closure surface 40. When the cap member 44 is tightened onto the housing 30, the shoulder 46, the spring 47, and the retainer 48 all cooperate to firmly hold the ball 49 seated on the closure surface 40.

A deformable diaphragm 50, which may be composed of any suitable deformable material compatible with the fluid product being dispensed, extends transversely of the longitudinal central axis X of the housing 30. Such suitable materials may be any of those materials recited above with respect to the valve seat, with the exception of ceramics. The outer peripheral regions 52 (see FIG. 2) are captured between the insert 34 and a shoulder 53 of the housing 30 when the cap member 44 is fully tightened onto the housing. As seen most clearly in FIG. 2, the diaphragm 50 has a central aperture 54 which allows it to freely receive a threaded stud 56 extending from a piston stem 60.

A proximal extension 62 of the piston stem 60 is threaddedly engaged with the stud 56 and, when tightened down onto the diaphragm 50, the piston stem 60 and the diaphragm 50 operate in a unitary manner. The piston stem supports a cylindrical product piston 66. The piston 66 may be composed of any suitable material compatible with the fluid product being dispensed. Such a suitable material may be any of those materials of which the insert 34 may be composed. The product piston acts as one with, and operates in unison with, the piston stem and its associated diaphragm 50.

The piston 66 may have a slight clearance fit with respect to the wall of chamber 67 or it may have a slight interference fit. It may even use an o-ring to insure a uniform wiping action with the wall of the chamber 67 as it moves. By reason of the cooperative relationship between the product piston 66 and the wall of the chamber 67 there is no need for a check valve between the supply source and the reservoir 36.

With continuing reference to FIG. 1, it is seen that the insert 34 is formed with the chamber 67 intermediate the reservoir 36 and the closure surface 40. A conduit 139 connects the lower end of chamber 67 with closure surface 40. The chamber 67 is dimensionally smaller than the reservoir 36. Furthermore, in the constructions illustrated, the chamber 67 is axially aligned with a center of symmetry of the cross-section of the reservoir 36. The product piston 66 is movable on the stem member 60 between an inactive position within the reservoir 36 withdrawn from the chamber 67 and an active position sealingly, slidably received within the chamber 67.

Figure 4:
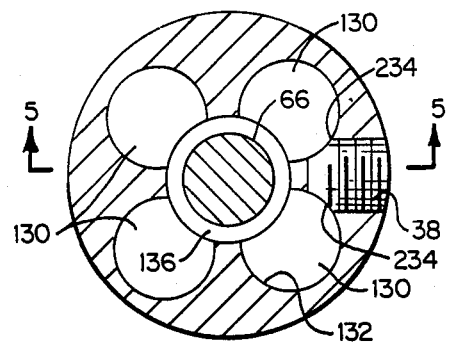
FIG. 4 is an alternative cross-section to that of FIG. 3.
Figure 5:
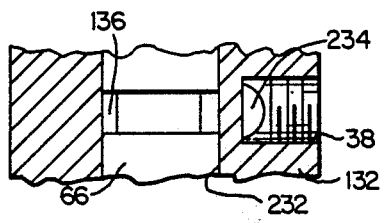
FIG. 5 is a fragmentary cross-section on section line 5—5 in FIG. 4.
Figure 6:
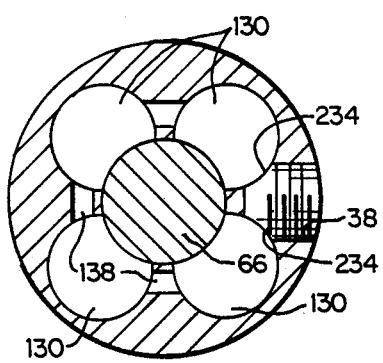
FIG. 6 is a further alternative cross-section to that of FIG. 3.

In order to provide for self-alignment of piston 66 with the cylindrical chamber 67, the reservoir 36 is divided into a plurality of sub-reservoirs 130 (see also FIGS. 3, 4 and 6) extending longitudinally of the insert 34 symmetrically about the axis X of the insert 34 and chamber 67. It is preferred that the reservoir 36 be divided into three or four sub-reservoirs although two sub-reservoirs or more than four reservoirs are also possible as long as the walls dividing the reservoir provide sufficient surface area to align and guide the piston. These sub-reservoirs 130 define walls 132 extending radically inwardly to define guide surfaces 232 interfacing with the piston 66 to ensure its alignment with chamber 67 for unimpeded entry into that chamber upon downward movement of the piston 66 when adhesive is to be dispensed. In FIGS. 1 and 3, three such sub-reservoirs 130 are provided with the inlet 38 directly opening into one of the sub-reservoirs. The supply of material to be dispensed to the other two sub-reservoirs is provided by gaps or channels 134 in the walls 132 adjacent the piston 66. If desired, more than one such gap 134 can be provided in each wall 132, between adjacent sub-reservoirs 130, to facilitate distribution of the fluid to be dispensed. Alternatively, as seen in FIGS. 4 and 5, communication between the sub-reservoirs may be by the provision of one (or more) annular recesses 136 in the piston 66 or, as seen in FIG. 6, by openings 138 in the walls 132. Yet another arrangement for providing communication between the sub-reservoirs 130 involves omitting the walls 132 partially or altogether in the region of the inlet 38. For self-alignment of the piston 66 to be maintained in this arrangement, the reservoir 36 and piston 66 must each be of sufficient length to allow walls 132 sufficient to provide an adequate length of guiding engagement between the guide surface 232 and the piston 66, even when the piston 66 is at its uppermost stroke position.

In the four sub-reservoir arrangements shown in FIGS. 4, 5 and 6 the inlet 38 enters the insert 34 at the location of wall 132 thereby to provide maximum thread length. Here the inlet 38 communicates with two sub-reservoirs 130 by openings 234 in the walls thereof. Such a location for the inlet 38 is also applicable to other pluralities of sub-reservoirs.

It will be appreciated that many variations of the above disclosed arrangements for providing communication between the sub-reservoirs are possible without departing from the concept of the present invention. For example, providing the alignment requirements are met, the annular recess 136 may extend axially for most of the length of piston 66 thereby resulting in two relatively short (axially) piston portions one at each end connected by a stem (not shown).

If desired, the bottom of the reservoir 36, adjacent the chamber 67, can have a conical shape or have tapered inserts (not shown) provided therein to force the dispensed material toward the center of the reservoir and into the chamber 67 to avoid dead spots where material accumulates.

To accommodate any misalignment of the piston 66 and the actuating mechanism 28, the actuating mechanism 28 is interconnected with the piston 66 by way of a misalignment tolerant connector 140 described hereinafter.

As the stem member 60 moves downwardly, the outer peripheral surface of the product piston 66 engages the wall of the chamber 67. Since the product within the reservoir 36 is drawn in by the vacuum created by the pistons return stroke, the product being dispensed will also have completely filled the chamber 67. With continued downward movement, the product piston 66 initially engages the wall of the chamber 67 and then continues to its farthest movement of its particular stroke. As the product piston moves downward in chamber 67, the product is thereby advanced and forces the ball 49 away from the closure surface 40. The amount of the product displaced by the product piston 66 is referred to as a "defined charge" of the product. When the product piston 66 reaches the end of its downward stroke, the ball 49 returns into engagement with the closure surface 40 under the bias of the spring 47 and the piston returns to the position shown in FIG. 1 under the bias of the spring 112.

The actuator unit 26, also as seen in FIG. 1., includes an elongate cylinder 82 with a longitudinally extending central bore 84 formed in its intermediate regions, a distal counterbore 86 and a proximal counterbore 88. Both counterbores 86 and 88 communicate with and are axially aligned relative to the central bore 84. An actuator shaft 90 is slidingly received in the central bore 84 and is integral with a drive piston 92 which is disposed within the counterbore 86. The piston 92, along with it actuator shaft 90, is reciprocable along an actuating axis which is the longitudinal axis X of the cylinder 82. The piston 92 may be fluid operated, preferably pneumatic, although other fluids, including liquids, could be utilized. Indeed, it will be appreciated that the actuator unit 26 could be of a completely different type, for example, an electrically operated solenoid or a mechanical cam. Also, operation of the actuator unit 26 may be under the control of an appropriate computer (not shown). However, in the instance of the actuator unit 26, o-ring seals 94 and 96 encircle the actuator shaft 90 at locations spaced in opposite directions from the piston 92. The piston 92 itself is also provided with a suitable o-ring seal 98.

Thus, viewing FIG. 1, in order to move the piston 92 downwardly, pressurized actuating fluid is introduced to an inlet 100 whereupon it is caused to flow via a conduit 102 into the counterbore 86. Any actuating fluid within the counterbore 86 beneath the piston 92 is then exhausted via a conduit 104 within the end member 32 and an outlet 106 therein with which it communicates. The actuator shaft 90 is prevented from rotating by means of a set screw 108 threadedly engaged with the cylinder 82 and radially disposed therein having an extremity which is positioned proximate to a longitudinal flat 110 formed in the shaft which serves as a keyway. A compression spring 112 is received in the counterbore 88 and one end rests on a supporting surface 114 thereof. In a manner which will be described subsequently, the compression spring 112 serves to retain the piston 92 in the retracted position illustrated in FIG. 1 when the piston is in the inactive condition. That is, air or other actuating fluid is normally used to move the piston 92 to the inactive position, but the spring 112 is an added expedient for doing so in the event of a loss of actuating fluid.

In a manner which will now be described, the piston 92 serves to operate the valve mechanism as most specifically represented by the ball 49 operating in conjunction with the closure surface 40. With continuing reference to FIG. 1, the end member 32 of the dispensing unit 22 is slidably received within the distal counterbore 86 of the actuating unit 26. An o-ring seal 116 suitably encircles the end member 32 short of its proximal end to assure a sealing relationship between the cylinder 82 and the end member 32. When an extreme distal rim 118 of the cylinder 82 firmly engages a shoulder 120 of the housing 30, an annular groove 122 formed in the outer surface of the end member 32 is aligned with a plurality of circumferentially spaced set screws 124 threadedly engaged with the cylinder 82 and extending radially therethrough. By reason of the construction just described, it will be appreciated that the dispensing unit 22 can be selectively attached to or removed from the actuator unit 26 and, further, that when the respective units are so joined, they can be prevented from separation by tightening the set screws 124 into engagement with the annular groove 122.

It is also noted that the extreme end of the extension 62 is formed with a male thread 126 (FIG. 2) which is engageable with a threaded ferrule 128 received within a central bore 142 in a cylindrical member 146 attached to the distal end of the shaft 90 by a threaded engagement 148. When assembled, the ferrule 128 is held captive within the central bore 142 by a circlip 144 housed in an internal groove in the central bore 142. The length of the ferrule is such that axial movement is faithfully conveyed to the piston 66 while a radial clearance provided between the ferrule and the central bore accommodates any axial misalignment between the actuator and the piston 66 thereby facilitating the desired self-alignment of the piston 66 with the chamber 67.

Figure 8:
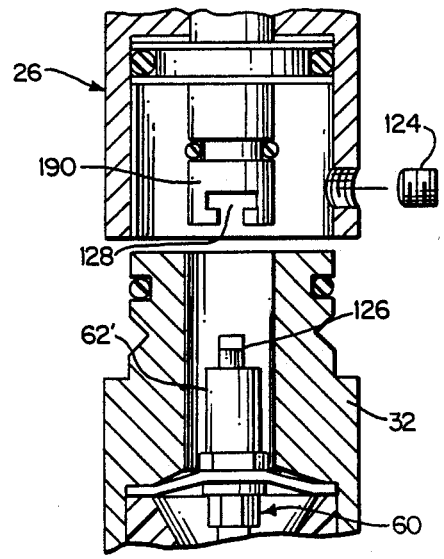
FIG. 8 is a perspective view of a part, a proximal extension, shown in FIG. 7
Figure 7:
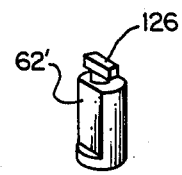
FIG. 7 is a fragmentary front elevational view, generally similar to FIG. 1, of the apparatus partly cut away and in section showing a second embodiment of interconnection between dispensing unit and actuator unit of the modular dispensing unit of the invention.

In an alternate embodiment (see FIGS. 7 and 8), the extreme end of the proximal extension 62' is formed with a T-connector 126 which is engageable with a similarly formed female slot 128 in the distal end of the shaft 190. As the dispensing unit 22 is inserted into the nozzle unit 24, the former is aligned so that the T-connector 126 is properly received by the slot 128. Thereupon, dispensing unit 22 is rotated 90 degrees so that the T-connector 126 is properly oriented and locked to prevent withdrawal of the stem member 60 from the actuator shaft 190. When this occurs, the stem member and the shaft are operable as a unit when they are moved along the longitudinal axis of the apparatus 20. Customarily, the set screws 124 would not be adjusted to engage the annular groove 122 until the T-connector 126 had been fully engaged with the slot 128. It will be appreciated that it is also possible to use two proximal extension 62 and 62' in series to provide increased accommodation of any misalignment between the piston 66 and the actuating mechanism 28 while facilitating assembly of the dispensing unit to the actuator unit by virtue of the T-connector.

Although FIGS. 1 and 2 have consistently illustrated one form and construction of the diaphragm 50, it need not be so limited but may be of a variety of shapes and constructions. However, in each instance the outer peripheral region of the diaphragm is held fixed while the central region is movable in a direction transverse to a general plane of the diaphragm. It will also be appreciated that an 0-ring seal arrangement may be substituted for the diaphragm as may a bellows or other suitable sealing arrangements.

The adjustment unit 28, which serves to selectively adjust the operations of the drive piston 29 so that it moves the product piston 66 to any one of a plurality of withdrawn positions, is not described in detail but operates in similar manner to that described in the above applications incorporated by reference. It is an adjustment utilizing a ball and spring detent arrangement to locate a cap in a plurality of discrete angular positions, the cap being rotated in threaded engagement with the actuator unit to control the stroke of piston 92 thereby adjusting the stroke of product piston 66.

The nozzle unit 24 carries a suitable dispensing nozzle (not shown) for the task at hand.

The operation of the modular dispensing apparatus 20 will now be described. The particular fluid to be dispensed, which may be, for example, a sealant or adhesive material in the form of a slurry, or otherwise, is introduced, under the vacuum produced by the pistons return stroke, via inlets 38 and 39 so as to fill the sub-reservoirs 130 forming reservoir 36 and the chamber 67. It will be noted that the fluid need not be supplied to inlet 38 under pressure. However, a positive pressure may be utilized if desired. At an appropriate time, the actuator unit 26 is operated to dispense the product from the dispensing unit 22. Viewing FIG. 1, this is achieved by introducing pressurized fluid, air for example, via the inlet 100 to the upper side of the piston 92. This moves the actuator shaft 90 downwardly and, with it, the stem member 60. This causes the diaphragm 50 to move from the position illustrated in FIG. 1 downwardly and, simultaneously, moves the product piston 66 into sliding, sealing engagement with the wall of the chamber 67, thereby isolating the chamber from the reservoir 36 while the ball 49 remains seated on the closure surface 40.

The farther the product piston 66 travels into the chamber 67, the greater is the amount of product dispensed by the dispensing unit 22. The product then flows through the retainer 48, through a needle member (not shown) of the nozzle unit 24 and onto a surface intended to receive the product. When the "defined charge" has been dispensed from the chamber 67, the flow of fluid through inlet 100 is caused to terminate and fluid flows through inlet 106 toward the bottom side of the drive piston 92 to return it to its rest position and simultaneously return the product piston 66 to its inactive position as seen in FIG. 1. Alternatively, the spring 112 could return the piston.

The misalignment tolerant connector 140 accommodates any lateral misalignment between the piston 66 and the actuator while faithfully transmitting axial motion.

While preferred embodiments of the invention have been disclosed in detail, it should be understood by those skilled in the art that various modifications may be made to the illustrated embodiments without departing from the spirit and scope thereof as described in the specification and defined in the appended claims.

What is claimed is:

1. Positive displacement pump apparatus for dispensing precise quantities of a fluid product comprising:

a housing defining a fluid reservoir and having an inlet for delivery of fluid to said reservoir and including a closure surface defining an outlet for dispensing the fluid product from said reservoir;

closure means normally biased to a closed position in engagement with said closure surface;

a chamber intermediate said reservoir and said closure surface for receiving a defined charge of the product; and a product piston movable between an inactive position within said reservoir withdrawn from said chamber and an active position sealingly, slidably received within said chamber to move said closure means, by means of the fluid product within said chamber, to an open position and thereby dispense the defined charge of the fluid product from said chamber;

said fluid reservoir being defined by a plurality of sub-reservoirs, forming walls providing guide surfaces for said product piston to provide self-alignment of said product piston for its slidable receipt in said chamber, said plurality of sub-reservoirs being interconnected by means for facilitating flow of said fluid product therebetween.

2. The positive displacement pump apparatus as set forth in claim 1
wherein said closure means includes:
a check ball; and
a spring biasing said check ball into sealing engagement with said closure surface.

3. A positive displacement pump apparatus as set forth in claim 1, wherein said plurality of sub-reservoirs is three.

4. A positive displacement pump apparatus as set forth in claim 3 wherein the inlet opens directly into at least one of said sub-reservoirs and said sub-reservoirs are generally ovoid in cross-section and extend substantially from said inlet to said chamber.

5. A positive displacement pump apparatus as set forth in claim 1, wherein said plurality of sub-reservoirs is four.

6. A positive displacement pump apparatus as set forth in claim 5 wherein said sub-reservoirs are generally circular in cross-section and extend substantially from said inlet to said chamber.

7. A positive displacement pump apparatus as set forth in claim 1 wherein said plurality of sub-reservoirs is at least three and said inlet extends into the wall between adjacent sub-reservoirs and communicates directly with these adjacent sub-reservoirs.

8. A positive displacement pump apparatus as set forth in claim 1, wherein said means for facilitating flow of said fluid product between adjacent sub-reservoirs is at least one opening in each said wall between adjacent sub-reservoirs.

9. A positive displacement pump apparatus as set forth in claim 1, wherein said piston has a cylindrical surface guided by said guide surfaces and said means for facilitating the flow of said fluid product between adjacent sub-reservoirs is at least one annular recess provided in the cylindrical surface of piston 66.

10. A positive displacement pump apparatus as set forth in claim 1 wherein said means for facilitating flow of said fluid product between adjacent sub-reservoirs is a gap in the walls in the region of the inlet.

11. A positive displacement pump apparatus as set forth in claim 1 wherein said reservoir, guide surfaces and chamber are centered on an axis with said sub-reservoirs symmetrically disposed about said axis, extending parallel to said axis and having a constant cross-section longitudinally of said axis.

12. A positive displacement pump apparatus as set forth in claim 11 wherein said guide surfaces extend substantially from said inlet to said chamber.

13. A positive displacement pump apparatus as set forth in claim 12 wherein said means for facilitating flow of said fluid product between adjacent sub-reservoirs is a gap in the walls defining said guide surface in the region of the inlet.

14. A positive displacement pump apparatus as set forth in claim 11 comprising a pump actuator interconnected with said product piston for reciprocation thereof by a misalignment tolerant connector accommodating axial misalignment of the actuator and piston.

15. A positive displacement pump apparatus as set forth in claim 14 wherein said connector comprises a ferrule rigidly connected to one of said piston and actuator, a cylindrical member rigidly connected to the other of said piston and actuator, said ferrule being captively housed in a bore in said cylindrical member with said ferrule and bore having sufficient radial clearance therebetween to accommodate said axial misalignment and sufficiently small-axial clearance therebetween.

16. A dispenser barrel for dispensing a fluid product comprising:
a housing defining a fluid reservoir and having an inlet for delivery of fluid to said reservoir and an outlet for dispensing the fluid product from said reservoir;
a product piston movable between an inactive position within said reservoir and an active position associated with said outlet to dispense fluid product therethrough;
said fluid reservoir being defined by a plurality of subreservoirs, forming walls providing guide surfaces for said product piston to provide self-alignment of said product piston, said plurality of sub-reservoirs being interconnected by means for facilitating flow of said fluid product therebetween.

17. A dispenser barrel according to claim 16 comprising a chamber intermediate said reservoir and said outlet for receiving the product, said guide surfaces providing self-alignment of said product piston for slidable receipt in said chamber.

18. A dispenser barrel set form in claim 16, wherein said plurality of sub-reservoirs is three.

19. A dispenser barrel as set forth in claim 17, wherein the inlet opens directly into a least one of said sub-reservoirs and said sub-reservoirs are generally avoid in cross-section and extend substantially from said inlet to said chamber.

20. A dispenser barrel as set forth in claim 16, wherein said plurality of sub-reservoirs is four.

21. A dispenser barrel as set forth in claim 17 wherein said sub-reservoirs are generally circular in cross-section and extend substantially from said inlet to said chamber.

22. A dispenser barrel as set forth in claim 16, where said plurality is at least three and said inlet extends into the wall between adjacent sub-reservoirs and communicates directly with these adjacent sub-reservoirs.

23. A dispenser barrel as set forth in claim 16, wherein said means for facilitating flow of said fluid product between adjacent sub-reservoirs is at least one opening in each said wall between adjacent sub-reservoirs.

24. A dispenser barrel as set forth in claim 16, wherein said piston has a cylindrical surface guided by said guide surfaces and said means for facilitating the flow of said fluid product between adjacent sub-reservoirs is at least one annular recess provided in the cylindrical surface of said piston.

25. A dispenser barrel as set forth in claim 16, wherein said means for facilitating flow of said fluid product between adjacent sub-reservoirs is a gap in the walls in the region of the inlet.

26. A dispenser barrel as set forth in claim 17 wherein said reservoir, guide surfaces and chamber are centered on an axis with said sub-reservoirs symmetrically disposed about said axis, extending parallel to said axis and having a constant cross-section longitudinally of said axis.

27. A dispenser barrel as set forth in claim 26 wherein said guide surfaces extend substantially from said inlet to said chamber.

28. A dispenser barrel as set forth in claim 27 wherein said means for facilitating flow of said fluid product between adjacent sub-reservoirs is a gap in the region of the inlet.

* * * * *

UNITED STATES PATENT AND TRADEMARK OFFICE
CERTIFICATE OF CORRECTION

PATENT NO. : 4,893,738

DATED : January 16, 1990

INVENTOR(S) : William A. GELINAS

It is certified that error appears in the above—identified patent and that said Letters Patent is hereby corrected as shown below:

Column 9, line 68 - delete "sufficient";

Column 10, line 2 - delete "sufficiently small";

Column 10, line 27 - change "a least" to "at least";

Column 10, line 29 - change "avoid" to "ovoid";

Column 10, line 37 - change "where" to "wherein";

Signed and Sealed this

Eighteenth Day of December, 1990

*Attest:*

HARRY F. MANBECK, JR.

*Attesting Officer*      *Commissioner of Patents and Trademarks*